United States Patent [19]

Kroenke

[11] 4,055,537
[45] Oct. 25, 1977

[54] SMOKE RETARDANT VINYL CHLORIDE AND VINYLIDENE CHLORIDE POLYMER COMPOSITIONS

[75] Inventor: William Joseph Kroenke, Brecksville, Ohio

[73] Assignee: The B. F. Goodrich Company, Akron, Ohio

[21] Appl. No.: 774,556

[22] Filed: Mar. 4, 1977

[51] Int. Cl.$^2$ ................................................ C08K 5/34
[52] U.S. Cl. ........................ 260/45.75 D; 260/42.49; 260/45.75 B; 260/45.75 F; 260/45.75 R; 260/45.75 W
[58] Field of Search ............... 260/42.49, 45.75 D, 260/45.75 W, 45.75 R, 45.75 F, 45.75 B

[56] References Cited

U.S. PATENT DOCUMENTS

| 3,821,151 | 6/1974 | Mitchell | 260/45.75 R |
| 3,845,001 | 10/1974 | Mitchell | 260/45.75 C |
| 3,870,679 | 3/1975 | Mitchell et al. | 260/45.75 N |
| 3,870,679 | 3/1975 | Mitchell et al. | 260/45.75 R |
| 3,956,231 | 5/1976 | Moore et al. | 260/45.75 R |
| 3,962,177 | 6/1976 | Dickens | 260/45.75 N |
| 3,965,068 | 6/1976 | Dickens | 260/45.75 P |
| 3,975,356 | 8/1976 | Dickens | 260/45.75 R |

*Primary Examiner*—V.P. Hoke
*Attorney, Agent, or Firm*—Charles A. Crehore

[57] ABSTRACT

Smoke retardant vinyl chloride and vinylidene chloride polymer compositions are obtained by including therein a synergistic mixture of (A) at least one melamine molybdate or substituted melamine molybdate and (B) at least one compound selected from the group consisting of $Bi_2O_3$, CdO, $MnCO_3$, $SnO_2$, $Ta_2O_3$, $TiO_2$, $H_2WO_4$, ZnO, $Zn_2SiO_4$, zinc borate, silica and hydrates thereof. Substantial smoke retardation is also obtained by including the above compounds individually in the vinyl chloride or vinylidene chloride polymer compositions.

18 Claims, No Drawings

SMOKE RETARDANT VINYL CHLORIDE AND VINYLIDENE CHLORIDE POLYMER COMPOSITIONS

BACKGROUND OF THE INVENTION

Vinyl chloride and vinylidene chloride polymers are known to be self-extinguishing and relatively more flame retardant than other polymers such as polyethylene, polypropylene, and the like. However, a substantial amount of smoke may be produced upon exposure of vinyl chloride and vinylidene chloride polymers to a flame. The fact that an additive is a flame retardant does not necessarily mean that it will have good smoke retardant properties, as is well known to those skilled in the art.

U.S. Pat. Nos. 3,821,151, 3,845,001, 3,870,679 and 3,903,028 teach use of certain copper, iron and/or molybdenum compounds as smoke retardants in PVC. U.S. Pat. No. 3,900,441 discloses mixtures of certain zinc and molybdenum compounds as smoke depressants in PVC. New smoke retardant vinyl chloride and vinylidene chloride polymer compositions are desired.

SUMMARY OF THE INVENTION

Smoke retardant vinyl chloride and vinylidene chloride polymer compositions are obtained by including therein a synergistic mixture of (A) at least one melamine molybdate or substituted melamine molybdate, the melamine or substituted melamine having the formula

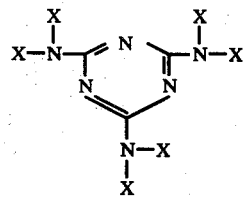

wherein X is hydrogen or an alkyl, alicyclic, aralkyl, alkaryl, aryl or heterocyclic group containing from 1 to 10 of C, O, S and/or N, and with two X's on each of one or more nitrogen atoms optionally being joined together to form a heterocyclic ring; and (B) at least one compound selected from the group consisting of $Bi_2O_3$, CdO, $MnCO_3$, $SnO_2$, $Ta_2O_5$, $TiO_2$, $H_2WO_4$, ZnO, $Zn_2SiO_4$, zinc borate, silica and hydrates thereof.

DETAILED DESCRIPTION

Smoke retardant vinyl chloride and vinylidene chloride polymer compositions are obtained by including therein a synergistic mixture of (A) at least one melamine molybdate or substituted melamine molybdate and (B) at least one compound selected from the group consisting of $Bi_2O_3$, CdO, $MnCO_3$, $SnO_2$, $Ta_2O_5$, $TiO_2$, $H_2WO_4$, ZnO, $Zn_2SiO_4$, zinc borate, silica and hydrates thereof. Suitable zinc borate hydrates include $2ZnO \cdot 3B_2O_3 \cdot 7H_2O$, $2ZnO \cdot 3B_2O_3 \cdot 9H_2O$ and $2ZnO \cdot 3B_2O_3 \cdot 3.5H_2O$. $2ZnO \cdot 3B_2O_3 \cdot 3.5H_2O$ is a preferred zinc borate hydrate sold under the trademark Firebrake ® ZB by United States Borax and Chemical Corporation. Suitable hydrated silicas include Hi-Sil 233 sold by PPG Industries.

The additive melamine molybdate and substituted melamine molybdates (hereinafter called amine molybdates), and the selected other compounds, used in this invention may be polycrystalline or amorphous fine powders, preferably with an average particle size from about 0.01 to about 800 microns, more preferably from about 0.1 to about 200 microns, and even more preferably from about 0.1 to about 50 microns. The additives are used in smoke retardant amounts, typically from about 0.1 to about 20 parts by weight, per 100 parts by weight of polymer. The amount of each additive may constitute from about 1% to about 99% by weight, more preferably from about 10% to about 90% by weight, of the additive compound mixture. Supporting media such as $SiO_2$, $Al_2O_3$ and the like may be used for the smoke retardant additives and in many cases are preferred, since additive surface area is increased greatly for smoke reduction purposes.

Amine Molybdates

Amine molybdates may be produced by reacting a suitable amine with a molybdenum compound such as $MoO_3$, molybdic acid or a molybdenum salt. Molybdenum salts include ammonium molybdate, ammonium dimolybdate, ammonium heptamolybdate (also called ammonium paramolybdate), ammonium octamolybdate, sodium molybdate, or the like. Ammonium molybdates are preferred and include ammonium molybdate $[(NH_4)_2MoO_4]$ itself, ammonium dimolybdate $[(NH_4)_2Mo_2O_7]$, ammonium heptamolybdate $[(NH_4)_6Mo_7O_{24} \cdot 4H_2O]$, and ammonium octamolybdate $[(NH_4)_4Mo_8O_{26} \cdot 5H_2)]$. Sodium molybdate also is preferred. Excellent results were obtained using ammonium dimolybdate, ammonium heptamolybdate, sodium molybdate, and the commercial so-called "molybdic acid", which consists primarily of ammonium molybdates.

The reaction preferably is conducted in the presence of an acid in order to maximize the amine molybdate yield. Suitable acids include organic acids containing one to 12 carbon atoms such as formic acid, acetic acid, propionic acid, benzonic acid, and the like; and inorganic acids such as hydrochloric acid, nitric acid, sulfuric acid, and the like. Mixtures of acids may also be used. Excellent results were obtained using formic acid, acetic acid, benzoic acid, hydrochloric acid, nitric acid and sulfuric acid. The amount of acid used may be varied widely from 0 to 10 equivalents and more of acid per equivalent of ammonium or other cation in a particular molybdenum salt. About a 1/1 equivalent ratio is preferred.

Suitable reaction media include water, alcohols such as ethanol or the like, and water/alcohol mixtures. Reaction components may be mixed in any order. A preferred reaction method comprises adding an aqueous solution of an ammonium molybdate or other molybdenum salt to an amine solution in dilute hydrochloric acid, followed by refluxing the reaction mixture for 0.25 to 16 hours, more preferably for 0.25 to 4 hours. Another preferred reaction method comprises charging all reaction components essentially simultaneously to a reaction vessel, followed by refluxing as just described.

The reaction mixture is stirred continuously as a slurry. When the desired reaction time has passed, the mixture is cooled to about room temperature (25° C.). The amine molybdate may be separated by filtration, centrifugation or the like and optionally washed with water, ethanol or a mixture thereof. The amine molybdate may be air dried at about 100°-200° C., or it may be vacuum dried at temperatures up to 150° C. and higher. The amine molybdate is identifiable by means of infrared and X-ray diffraction spectroscopy.

Melamine and substituted melamines suitable for preparing melamine molybdate and substituted melamine molybdates have the formula

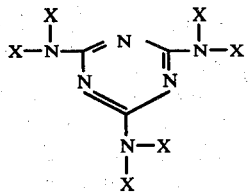

wherein X is hydrogen or an alkyl, alicyclic, aralkyl, alkaryl, aryl or heterocyclic group containing from 1 to 10 atoms of C, O, S and/or N. Two X's on each of one or more nitrogen atoms may also be joined together to form a heterocyclic ring such as a morpholino group, for example as in 2,4,6-tri(morpholino)-1,3,5-triazine. Other examples of suitable substituted melamines include N,N',N"-hexaethylmelamine; 2-anilino-4-(2',4'-dimethylanilino)-6-piperidino-1,3,5-triazine; and 2,4,6-tri(N-methylanilino)-1,3,5-triazine. Melamine is preferred since melamine molybdate is both white and highly effective as a smoke retardant. Melamine molybdate also processes easily without discoloring the polymers.

Polymers and Smoke Retardant Compositions

Vinyl chloride and vinylidene chloride polymers used in this invention include homopolymers, copolymers and blends of homopolymers and/or copolymers. The vinyl chloride and vinylidene chloride polymes may contain from 0 to about 50% by weight of at least one other olefinically unsaturated monomer, more preferably from 0 to about 50% by weight of at least one other vinylidene monomer (i.e., a monomer containing at least one terminal $CH_2=C-$ group per molecule) copolymerized therewith, even more preferably from 0 to about 20% by weight of such vinylidene monomer. Suitable monomers include 1-olefins containing from 2 to 12 carbon atoms, more preferably from 2 to 8 carbon atoms, such as ethylene, propylene, 1-butene, isobutylene, 1-hexene, 4-methyl-1-pentene, and the like; dienes containing from 4 to 10 carbon atoms including conjugated dienes as butadiene, isoprene, piperylene, and the like; ethylidene norbornene and dicyclopentadiene; vinyl esters and allyl esters such as vinyl acetate, vinyl chloroacetate, vinyl propionate, vinyl laurate, allyl acetate, and the like; vinyl aromatics such as styrene, α-methyl styrene, chlorostyrene, vinyl toluene, vinyl naphthalene, and the like; vinyl and allyl ethers and ketones such as vinyl methyl ether, allyl methyl ether, vinyl isobutyl ether, vinyl n-butyl ether, vinyl chloroethyl ether, methyl vinyl ketone, and the like; vinyl nitriles such as acrylonitrile, methacrylonitrile, and the like; cyanoalkyl acrylates such as 60-cyanomethyl acrylate, the α-,β- and γ-cyanopropyl acrylates, and the like; olefinically unsaturated carboxylic acids and esters thereof, including α,β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methyl methacrylate, ethyl methacrylate, butyl methacrylate, glycidyl methacrylate, and the like, and including esters of maleic and fumaric acid, and the like; amides of the α,β-olefinically unsaturated carboxylic acids such as acrylamide, and the like; divinyls, diacrylates and other polyfunctional monomers such as divinyl benzene, divinyl ether, diethylene glycol diacrylate, ethylene glycol dimethacrylate, methylene bis-acrylamide, allyl pentaerythritol, and the like; and bis(β-haloalkyl)-alkenyl phosphonates such as bis(β-chloroethyl)vinyl phosphonate, and the like.

More preferred monomers include 1-olefins containing from 2 to 12 carbon atoms, more preferably from 2 to 8 carbon atoms, such as ethylene, propylene, 1-butene, isobutylene, 1-hexene, 4-methyl-1-pentene, and the like; vinyl esters and allyl esters such as vinyl acetate, vinyl chloroacetate, vinyl propionate, vinyl laurate, allyl acetate, and the like; olefinically unsaturated carboxylic acids and esters thereof, including α,β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioacrylate, methyl methacrylate, ethyl methacrylate, butyl methacrylate, glycidyl methacrylate, and the like, and including esters of maleic and fumaric acid, and the like; and amides of α,β-olefinically unsaturated carboxylic acids such as acrylamide, and the like.

The vinyl chloride and vinylidene chloride polymers may be prepared by any method known to the art such as by emulsion, suspension, bulk or solution polymerization. The additive compounds may be mixed with the polymer emulsion, suspension, solution or bulk mass before monomer recovery and/or drying. More preferably, the compounds may be mixed with dry granular or powdered polymers. The polymers and compounds may be mixed thoroughly in granular or powder form in apparatus such as a Henschel mixer, or the like. Alternatively, this step may be eliminated and the mixing done while the polymer mass is fluxed, fused and masticated to homogeneity under fairly intensive shear in or on a mixer apparatus having its metal surface in contact with the material. The fusion temperature and time will vary according to the polymer composition and level of additive compounds but will generally be in the range of about 300° to 400° F. and 2 to 10 minutes.

Smoke retardancy may be measured using an NBS Smoke Chamber according to procedures described by Gross et al., "Method for Measuring Smoke from Burning Materials", *Symposium on FIre Test Methods - Restraint & Smoke* 1966, ASTM STP 422, pp. 166–204. Maximum smoke density ($D_m$) is a dimensionless number and has the advantage of representing a smoke density independent of chamber volume, specimen size or photometer path length, provided a consistent dimensional system is used. Percent smoke reduction is calculated using this equation:

$$\frac{D_m/g \text{ of Sample} - D_m/g \text{ of Control}}{D_m/g \text{ of Control}} \times 100.$$

The term "$D_m/g$" means maximum smoke density per gram of sample. $D_m$ and other aspects of the physical optics of light transmission through smoke are discussed fully in the above ASTM publication.

Smoke retardance may be measured quickly using the Goodrich Smoke-Char Test. Test samples may be prepared by dry blending polymer resin and smoke retardant additives. The blend is ground in a liquid $N_2$- cooled grinder to assure uniform dispersion of the smoke retardant additives in the resin. Small (about 0.3g) samples of the polymer blend are pressed into pellets about ¼ inch in diameter for testing. Alternatively, test samples may be prepared by blending resin, smoke retardant additives and lubricant(s) or processing aid(s) in a blender such as an Osterizer blender. The blend is milled, pressed into sheets, and cut into small (about 0.3 gram) samples for testing. The test samples are placed on a screen and burned for 60 seconds with a propane gas flame rising vertically from beneath the samples. Sample geometry at a constant weight has been found not to be significant for the small samples used in this test. A Bernz-O-Matic pencil flame burner head is used with gas pressure maintained at about 40 psig. Each sample is immersed totally and continuously in the flame. Smoke from the burning sample rises in a vertical chimney and passes through the light beam of a Model 407 Precision Wideband Photometer (Grace Electronics, Inc., Cleveland, Ohio) coupled with a photometer integrator. Smoke generation is measured as integrated area per gram of sample.

The vinyl chloride and vinylidene chloride polymer compositions of this invention may contain the usual compounding ingredients known to the art such as fillers, stabilizers, opacifiers, lubricants, processing aids, impact modifying resins, plasticizers, antioxidants, and the like.

The following examples illustrate the present invention more fully.

EXAMPLE 1

Synthesis of Melamine Molybdate in Aqueous Medium

Melamine molybdate having a 1/1 molybedenum/melamine molar ratio was prepared in a non-acid reaction medium as follows. 100 grams of melamine was dissolved in 2.5 liters of distilled water by heating to reflux in a 3-liter round-bottomed flask equipped with a watercooled condenser. 275.30 grams of ammonium heptamolybdate was dissolved in 1 liter of hot distilled water and then added to the first solution. A white precipitate formed immediately.

The reaction mixture was refluxed for 4 hours and thereafter filtered hot through Whatman No. 42 filter paper that was backed by a Macherey, Negel and Company (Duxen, Germany) MN-85 filter paper supported on a Buchner funnel. A white solid was separated and washed with three 50 ml water portions and three 50 ml ethanol portions. The solid was dried for about 16 hours at 57° C. and found to weigh 235.01 grams.

A white crystalline solid precipitated from the filtrate after it stood overnight at room temperature. The precipitate was recovered and washed as just described. It was vacuum dried for 1 hour at 70° C. and found to weigh 10.70 grams. Infrared and X-ray diffraction spectroscopic analyses demonstrated that both solids were identical, i.e., both were melamine molybdate. Total product yield was 245.71 grams.

EXAMPLES 2 - 18

Examples 2 - 18 summarized in Table I illustrate the production of melamine molybdate having a 1/1 molybdenum/melamine molar ratio using the general reaction and recovery procedures of Example 1 in an aqueous medium.

TABLE I

| Example | Starting Molybdenum Compound | (grams)+ | Melamine (grams) | Molybdenum/Melamine Molar Ratio in Reactants | H$_2$O (ml) | Reaction Time | Melamine Molybdate Yield (grams) |
|---|---|---|---|---|---|---|---|
| 2 | 2.57 | (m) | 2.00 | 0.96 | 100 | 3 min. | 1.50 |
| 3 | 5.14 | (m) | 4.00 | 0.96 | 250 | 1 hr. | 5.25 |
| 4 | 13.34 | (m) | 10.00 | 1.0 | 344 | 4 hr. | 7.60 |
| 5 | 10.27 | (m) | 4.00 | 1.9 | 275 | 5 min. | 8.15 |
| 6 | 10.27 | (m) | 4.00 | 1.9 | 275 | 5 min. | 7.72 |
| 7 | 275.30 | | 100.00 | 2.0 | 3500 | 15 min. | 247.22 |
| 8 | 275.30 | | 100.00 | 2.0 | 3500 | 35 min. | 245.23 |
| 9 | 10.27 | (m) | 4.00 | 1.9 | 275 | 1 hr. | 8.20 |
| 10 | 275.30 | | 100.00 | 2.0 | 3500 | 3 hr. | 235.01 |
| 11 | 13.88 | | 5.00 | 2.0 | 344 | 4 hr. | 10.76 |
| 12 | 275.30 | | 100.00 | 2.0 | 3500 | 4 hr. | 237.67 |
| 13 | 13.34 | (m) | 5.00 | 2.0 | 344 | 17 hr. | 9.80 |
| 14 | 7.70 | (m) | 2.00 | 2.9 | 150 | 1 min. | 4.50 |
| 15 | 15.41 | (m) | 4.00 | 2.9 | 300 | 5 min. | 9.80 |
| 16 | 15.41 | (m) | 4.00 | 2.9 | 300 | 1 hr. | 9.83 |
| 17 | 15.41 | (m) | 4.00 | 2.9 | 300 | 4 hr. | 10.15 |
| 18 | 13.34 | (m) | 3.33 | 3.0 | 344 | 4 hr. | 6.50 |

+Amonium heptamolybdate used, except where indicated otherwise.
(m) = "Baker 0206 Molybdic Acid" which comprises primarily at least one ammonium molybdate.

EXAMPLES 19 - 39

Examples 19 - 39 summarized in Table II illustrate the production of melamine molybdate using the general reaction and recovery procedures of Example 1 in an aqueous HCl medium. The melamine molybdate produced in Examples 19 - 24 had a 1/1 molybdenum/melamine molar ratio. In Examples 26 - 39, the melamine molybdate produced had a 2/1 molybdenum/melamine molar ratio. The product in Example 25 was a mixture of the 1/1 and 2/1 molybdenum/melamine molar ratio melamine molybdates.

TABLE II

| Example | Starting Ammonium Molybdate (grams)+ | | Melamine (grams) | Molybdenum/Melamine Molar Ratio in Reactants | H$_2$O (ml) | 37% HCl (grams) | Reaction Time | Melamine Molybdate Yield (grams) |
|---|---|---|---|---|---|---|---|---|
| 19 | 2.80 | | 2.00 | 1.0 | 60 | 1.34 | 5 min. | 4.28 |
| 20 | 14.00 | | 10.00 | 1.0 | 275 | 6.70 | 15 min. | 21.45 |
| 21 | 13.48 | (D) | 10.00 | 1.0 | 275 | 7.81 | 30 min. | 21.88 |
| 22 | 13.48 | (D) | 10.00 | 1.0 | 175 | 7.81 | 30 min. | 20.99 |
| 23 | 140.00 | | 100.00 | 1.0 | 2750 | 67.0 | 3.3 hr. | 211.23 |
| 24 | 14.00 | | 10.00 | 1.0 | 275 | 6.70 | 4 hr. | 21.80 |
| 25 | 21.00 | | 10.00 | 1.5 | 288 | 10.05 | 2 hr. | 28.35 |
| 26 | 28.00 | | 10.00 | 2.0 | 300 | 13.40 | 15 min. | 32.58 |
| 27 | 28.00 | | 10.00 | 2.0 | 200 | 13.40 | 30 min. | 34.45 |

TABLE II-continued

| Example | Starting Ammonium Molybdate (grams)+ | | Melamine (grams) | Molybdenum/Melamine Molar Ratio in Reactants | $H_2O$ (ml) | 37% HCl (grams) | Reaction Time | Melamine Molybdate Yield (grams) |
| --- | --- | --- | --- | --- | --- | --- | --- | --- |
| 28 | 26.95 | (D) | 10.00 | 2.0 | 200 | 15.62 | 30 min. | 32.79 |
| 29 | 28.00 | | 10.00 | 2.0 | 200 | 13.40 | 30 min. | 33.48 |
| 30 | 28.00 | | 10.00 | 2.0 | 150 | 13.40 | 30 min. | 33.48 |
| 31 | 28.00 | | 10.00 | 2.0 | 300 | 13.40 | 30 min. | 33.50 |
| 32 | 280.00 | | 100.00 | 2.0 | 3000 | 134.0 | 30 min. | 339.55 |
| 33 | 28.00 | | 10.00 | 2.0 | 200 | 13.40 | 2 hr. | 33.02 |
| 34 | 26.95 | (D) | 10.00 | 2.0 | 300 | 15.63 | 3 hr. | 32.96 |
| 35 | 28.00 | | 10.00 | 2.0 | 300 | 13.40 | 4 hr. | 32.58 |
| 36 | 280.00 | | 100.00 | 2.0 | 3000 | 134.0 | 4.2 hr. | 333.94 |
| 37 | 28.00 | | 10.00 | 2.0 | 150 | 13.40 | 4 hr. | 32.80 |
| 38 | 28.00 | | 10.00 | 2.0 | 200 | 13.40 | 16 hr. | 32.70 |
| 39 | 28.00 | | 10.00 | 2.0 | 300 | 13.40 | 16 hr. | 32.68 |

+Ammonium heptamolybdate used, except where indicated otherwise (D=ammonium dimolybdate).

EXAMPLE 40

Synthesis of Melamine Molybdate in Aqueous Formic Acid Medium

Melamine molybdate was prepared in the presence of formic acid as follows. 10 grams of melamine, 7.30 grams of formic acid, and 250 ml water were dissolved together by refluxing in a 500 ml. round-bottomed flask equipped with a stirrer and water-cooled condenser. 26.25 grams of ammonium dimolybdate was dissolved in 50 ml hot water and then added to the first solution. A white precipitate formed immediately.

The reaction mixture was refluxed for one hour and filtered hot as in Example 1. A white solid was recovered and washed three times with water. The solid weighed 29.25 grams after being vacuum dried for 3.25 hours at 120° C.

EXAMPLE 41

Synthesis of Melamine Molybdate in Aqueous Acetic Acid Medium

Melamine molybdate was prepared in the presence of acetic acid as follows. 10 grams of melamine, 9.52 grams of acetic acid, and 250 ml water were dissolved together by refluxing in a 500 ml round-bottomed flask equipped with a stirrer and water-cooled condenser. 26.95 grams of ammonium dimolybdate was dissolved in 50 ml. hot water and then added to the first solution. A white precipitate formed immediately.

The reaction mixture was refluxed for one hour, cooled to room temperature (about 25° C.), and filtered through Whatman No. 42 filter paper that was backed by a Macherey, Negel and Company (Duren, Germany) MN-85 filter paper supported on a Buchner funnel. A white solid was recovered and washed three times with water. The solid weighed 28.38 grams after being vacuum dried for 3 hours at 120° C.

EXAMPLE 42

Synthesis of Melamine Molybdate in Aqueous Benzoic Acid Medium

Melamine molybdate was prepared in the presence of benzoic acid as follows. 5 grams of melamine, 9.68 grams of benzoic acid, and 250 ml water were dissolved together by refluxing in a 500 ml round-bottomed flask equipped with a stirrer and water-cooled condenser. 13.47 grams of ammonium dimolybdate was dissolved in 25 ml hot water and then added to the first solution. A white precipitate formed immediately.

The reaction mixture was refluxed for one hour and filtered hot as in Example 1. A white solid was recovered and washed three times with water. The solid weighed 13.04 grams after being vacuum dried for 3 hours at 120° C.

EXAMPLE 43

Synthesis of N,N',N''-Hexaethylmelamine Molybdate in Aqueous HCl Medium

N,N',N''-hexaethylmelamine molybdate having a 2/1 molybdenum/N,N',N''-hexaethylmelamine molar ratio was prepared in the presence of HCl as follows. 10 grams N,N',N''-hexaethylmelamine, 6.69 grams of a 37 wt.% aqueous HCl solution, and 250 ml water were mixed together and heated to reflux in a 500 ml round-bottomed flask equipped with a stirrer and water-cooled condenser. 11.54 grams of ammonium dimolybdate was dissolved in 25 ml hot water and then added to the refluxing mixture. A bright yellow precipitate formed immediately.

The reaction mixture was refluxed for 20 minutes, cooled to room temperature, and filtered as in Example 41. A bright yellow solid was recovered and washed three times with water. The solid weighed 19.32 grams after being vacuum dried for 2.25 hours at 120° C.

EXAMPLE 44

Synthesis of 2-Anilino-4-(2',4'-dimethylanilino)-6-piperidino-1,3,5-triazine Molybdate in Aqueous HCl Medium 2-Anilino-4-(2',4'-dimethylanilino)-6-piperidino-1,3,5-triazine is a substituted melamine having the formula

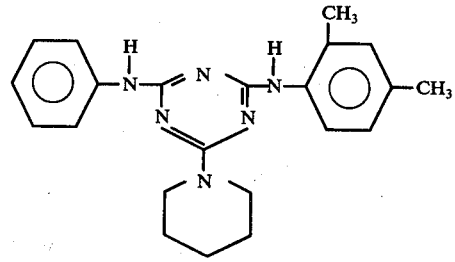

2-Anilino-4-(2',4'-dimethylanilino)-6-piperidino-1,3,5-triazine molybdate having a 2/1 molar ratio of molybdenum to substituted melamine was prepared in the presence of HCl as follows. 5 grams of the substituted melamine, 2.63 grams of a 37 wt.% aqueous HCl solution, 125 ml water and 160 ml ethanol were dissolved together by refluxing in a 500 ml round-bottomed flask equipped with a stirrer and water-cooled condenser. 4.54 grams of ammonium dimolybdate was dissolved in 10 ml hot water and then added to the first solution. As off-white precipitate formed immediately.

The reaction mixture was refluxed for 20 minutes, cooled to room temperature and filtered as in Example 41. An off-white solid was recovered and washed twice with a 50/50 by volume ethanol/water solution and twice with water. The solid weighed 8.22 grams after being vacuum dried for 2.5 hours at 120° C.

EXAMPLE 45

Synthesis of 2,4,6-Tri(N-methylanilino)-1,3,5-triazine Molybdate in Aqueous HCl Medium 2,4,6-Tri(N-methylanilino)-1,3,5-triazine is a substituted melamine having the formula

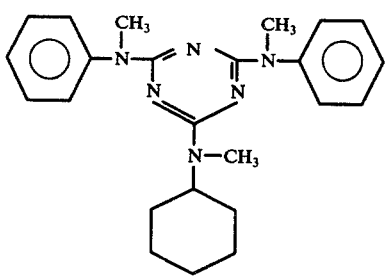

2,4,6-Tri(N-methylanilino)-1,3,5-triazine molybdate having a 2/1 molar ratio of molybdenum to substituted melamine was prepared in the presence of HCl as follows. 7 grams of substituted melamine, 3.48 grams of a 37 wt.% aqueous HCl solution, 75 ml water and 100 ml ethanol were dissolved together by refluxing in a 500 ml round-bottomed flask equipped with a stirrer and water-cooled condenser. 6 grams of ammonium dimolybdate was dissolved in 12 ml hot water and then added to the first solution. A yellow precipitate formed immediately.

The reaction mixture was refluxed for 1.25 hours, cooled to room temperature and filtered as in Example 41. A yellow solid was recovered and washed twice with water. The solid weighed 11.90 grams after being vacuum dried for 4.25 hours at 120° C.

EXAMPLE 46

Synthesis of 2,4,6-tri(morpholino)-1,3,5-triazine Molybdate in Aqueous HCl Medium 2,4,6-Tri(morpholino)-1,3,5-triazine is a substituted melamine having the formula

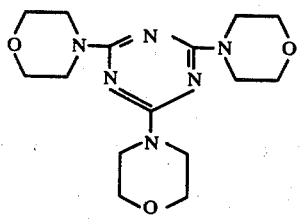

2,4,6-Tri(morpholino)-1,3,5-triazine molybdate having a 2/1 molar ratio of molybdenum to substituted melamine was prepared in the presence of HCl as follows. 3.50 grams of substituted melamine, 2.05 grams of a 37 wt.% aqueous HCl solution, 88 ml water and 88 ml ethanol were dissolved together by refluxing in a 500 ml round-bottomed flask equipped with a stirrer and water-cooled condenser. 3.50 grams of ammonium dimolybdate was dissolved in 8 ml hot water and then added to the first solution. A bright yellow precipitate formed immediately.

The reaction mixture was refluxed for 1 hour, cooled to room temperature and filtered as in Example 41. A yellow solid was recovered and washed twice with a 50/50 by volume ethanol/water solution and twice with water. The solid weighed 6.20 grams after being vacuum dried for 2.5 hours at 120° C.

EXAMPLES 47 – 57

The following recipe was used:

| Material | Parts |
| --- | --- |
| Polyvinyl Chloride+ | 100 |
| Polyethylene Powder Processing Aid | 2 |
| Dibutyltinbisisooctylthioglycollate | 2 |
| Additive (A)++ | Variable |
| Additive (B)+++ | Variable |

+Homopolymer having an inherent viscosity of about 0.98–1.04; ASTM Classification GP-5-15443.
++Melamine molybdate having a 2/1 molybdenum/melamine molar ratio. The control sample contained no additive.
+++Compound selected from the group consisting of $Bi_2O_3$, CdO, $MnCO_3$, $SnO_2$, $Ta_2O_5$, $TiO_2$, $H_2WO_4$, $Zn_2SiO_4$, zinc borate ($ZN_2B_6O_{11}$), and a precipitated, hydrated silica, the latter compound sold under the trademark "Hi-Sil 233" by PPG Industries. The control sample contained no additive.

Each experimental sample was prepared by milling the recipe materials on a two-roll mill for about 5 minutes at a roll surface temperature of about 320° F. The milled samples were pressed into 6 × 6 × 0.025 inch sheets. Pressing was done at about 320°–330° F. using 40,000 lbs. of force applied to a 4-in. ram. The samples were given a 2 – 5 minute preheat prior to pressing for 8 minutes under full load.

The molded samples were cut into 2⅞ × 2⅞ × 0.025 inch sections. Testing was performed using the flaming mode of the NBS Smoke Chamber test (ASTM STP 422, pp. 166–204) described heretofore. Test results are given in Table III.

TABLE III

| Example | Additive (A) (phr) | Additive (B) (phr) | Maximum Smoke Density Per Gram of Sample ($D_m/g$) | Smoke Reduction % |
| --- | --- | --- | --- | --- |
| 47 | — | — | 73.15 | — |
|  | Melamine Molybdate (5) | — | 21.06 | 71 |
|  | — | $Bi_2O_3$ (5) | 24.20 | 67 |
| 48 | Malamine Molybdate (2.5) | $Bi_2O_3$ (2.5) | 17.54 | 76 |
|  | — | — | 61.02 | — |
|  | Malamine Molybdate (5) | — | 28.82 | 53 |
|  | — | CdO (5) | 33.23 | 46 |

TABLE III-continued

| Example | Additive (A) (phr) | Additive (B) (phr) | Maximum Smoke Density Per Gram of Sample ($D_m/g$) | Smoke Reduction % |
|---|---|---|---|---|
| 49 | Melamine Molybdate (2.5) | CdO (2.5) | 15.91 | 74 |
|  | — | — | 53.59 | — |
|  | Melamine Molybdate (5) | — | 26.67 | 50 |
|  | — | $MnCO_3$ (5) | 36.56 | 32 |
|  | Melamine Molybdate (2.5) | $MnCO_3$ (2.5) | 24.21 | 55 |
| 50 | — | — | 73.15 | — |
|  | Melamine Molybdate (5) | — | 25.50 | 65 |
|  | — | $SnO_2$ (5) | 32.84 | 55 |
|  | Melamine Molybdate (2.5) | $SnO_2$ (2.5) | 21.30 | 71 |
| 51 | — | — | 64.74 | — |
|  | Melamine Molybdate (5) | — | 28.41 | 56 |
|  | — | $Ta_2O_5$ (5) | 56.31 | 13 |
|  | Melamine Molybdate (2.5) | $Ta_2O_5$ (2.5) | 24.48 | 62 |
| 52 | — | — | 53.71 | — |
|  | Melamine Molybdate (5) | — | 23.45 | 56 |
|  | — | $TiO_2$ (5) | 27.68 | 48 |
|  | Melamine Molybdate (2.5) | $TiO_2$ (2.5) | 19.47 | 64 |
| 53 | — | — | 64.74 | — |
|  | Melamine Molybdate (5) | — | 28.41 | 56 |
|  | — | $H_2WO_4$ (5) | 30.40 | 53 |
|  | Melamine Molybdate (2.5) | $H_2WO_4$ (2.5) | 23.38 | 64 |
| 54 | — | — | 62.65 | — |
|  | Melamine Molybdate (2) | — | 30.31 | 52 |
|  | — | ZnO (2) | 41.19 | 34 |
|  | Melamine Molybdate (1) | ZnO (1) | 22.49 | 64 |
| 55 | — | — | 62.65 | — |
|  | Melamine Molybdate (2) | — | 30.31 | 52 |
|  | — | $Zn_2B_6O_{11}$ (2) | 40.94 | 35 |
|  | Melamine Molybdate (1) | $Zn_2B_6O_{11}$ (1) | 29.74 | 53 |
| 56 | — | — | 62.65 | — |
|  | Melamine Molybdate (2) | — | 30.31 | 52 |
|  | — | $Zn_2SiO_4$ (2) | 37.89 | 40 |
|  | Melamine Molybdate (1) | $Zn_2SiO_4$ (1) | 25.51 | 60 |
| 57 | — | — | 63.87 | — |
|  | Melamine Molybdate (5) | — | 24.41 | 62 |
|  | — | Hydrated Silica+(5) | 38.33 | 38 |
|  | Melamine Molybdate (2.5) | Hydrated Silica+(2.5) | 22.94 | 64 |

+Hi-Sil 233 from PPG Industries.

The test data in Table III demonstrates that the additive mixtures are synergistic and substantially retard smoke formation during burning of rigid polyvinyl chloride in the NBS Smoke Chamber (ASTM STP 442, pp. 166-204). The results also demonstrate the smoke retardant effects of individual additives in the same test.

The improved smoke retardant vinyl chloride and vinylidene chloride polymer compositions of this invention are useful wherever smoke resistance is desirable, such as in carpets, house siding, plastic components for airplane interiors, and the like. Of course, overall suitability for a particular use will depend upon other factors as well, such as comonomer type and level, compounding ingredient type and level, polymer particle size, and the like.

I claim:

1. A smoke retardant composition comprising a vinyl chloride or vinylidene chloride polymer together with a smoke retardant amount of A. at least one melamine molybdate or substituted melamine molybdate, the melamine or substituted melamine having the formula

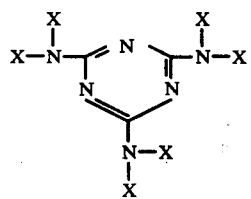

wherein X is hydrogen or an alkyl, alicyclic, aralkyl, alkaryl, aryl or heterocyclic group containing from 1 to 10 atoms of C, O, S and/ or N, and with two X's on each of one or more nitrogen atoms optionally being joined together to form a heterocyclic ring; and B. at least one compound selected from the group consisting of $Bi_2O_3$, CdO, $MnCO_3$, $SnO_2$, $Ta_2O_5$, $TiO_2$, $H_2WO_4$, ZnO, $Zn_2SiO_4$, zinc borate, and hydrates thereof.

2. A composition of claim 1 wherein said compounds (A) and (B) are present in a total amount from about 0.01 to about 20 weight parts per 100 weight parts of polymer.

3. A composition of claim 2 wherein said polymer contains copolymerized therewith from 0 to about 50% by weight of at least one other olefinically unsaturated monomer.

4. A composition of claim 3 wherein said polymer contains copolymerized therewith from 0 to about 20% by weight of said other monomer.

5. A composition of claim 4 wherein said other monomer is selected from the group consisting of 1-olefins containing from 2 to 12 carbon atoms, vinyl esters, α,β-olefinically unsaturated carboxylic acids and esters thereof, amides of α,β-olefinically unsaturated carboxylic acids, and esters of fumaric and maleic acid.

6. A composition of claim 5 wherein said melamine molybdate or substituted melamine molybdate and said compound (B) have average particle sizes from about 0.1 to about 200 microns.

7. A composition of claim 3 wherein compound (A) is melamine molybdate and said compound (B) is $Bi_2O_3$.

8. A composition of claim 3 wherein said compound (A) is melamine molybdate and said compound (B) is CdO.

9. A composition of claim 3 wherein said compound (A) is melamine molybdate and said compound (B) is $MnCO_3$.

10. A composition of claim 3 wherein said compound (A) is melamine molybdate and said compound (B) is $SnO_2$.

11. A composition of claim 3 wherein said compound (A) is melamine molybdate and said compound (B) is $Ta_2O_5$.

12. A composition of claim 3 wherein said compound (A) is melamine molybdate and said compound (B) is $TiO_2$.

13. A composition of claim 3 wherein said compound (A) is melamine molybdate and said compound (B) is $H_2WO_4$.

14. A composition of claim 3 wherein said compound (A) is melamine molybdate and said compound (B) is ZnO.

15. A composition of claim 3 wherein said compound (A) is melamine molybdate and said compound (B) is $Zn_2SiO_4$.

16. A composition of claim 3 wherein said compound (A) is melamine molybdate and said compound (B) is zinc borate.

17. A composition of claim 3 wherein said compound (A) is melamine molybdate and said compound (B) is hydrated silica.

18. A composition of claim 3 wherein said compound (A) is melamine molybdate and said compound (B) is zinc borate hydrate.

* * * * *

UNITED STATES PATENT AND TRADEMARK OFFICE
CERTIFICATE OF CORRECTION

PATENT NO. : 4,055,537
DATED : October 25, 1977
INVENTOR(S) : William Joseph Kroenke It is certified that error appears in the above-identified patent and that said Letters Patent are hereby corrected as shown below:

Column 1, line 42, after "10" insert --- atoms ---.

Column 1, line 59, after "2ZnO" insert --- $\cdot 3B_2O_3$ ---.

Column 2, line 27, after "$\cdot 5H_2$" insert --- O ---.

Column 2, line 37, "benzonic" should be --- benzoic --- .

Column 3, line 37, after "=C" delete " ——" and insert --- < --- .

Column 3, line 56, "60" should be --- α --- .

Column 4, line 48 "FIre" should be --- Fire ---.

Column 6, line 7, "Duxen" should be --- Düren --- .

Column 8, line 67, "As" should be --- An --- .

Signed and Sealed this

Eleventh Day of April 1978

[SEAL]

Attest:

RUTH C. MASON
Attesting Officer

LUTRELLE F. PARKER
Acting Commissioner of Patents and Trademarks